United States Patent [19]

Bailey

[11] Patent Number: 4,577,285

[45] Date of Patent: Mar. 18, 1986

[54] GAGE BLOCK MANAGEMENT SYSTEM

[75] Inventor: Donald H. Bailey, Bloomfield Hills, Mich.

[73] Assignee: Suburban Tool, Inc., Birmingham, Mich.

[21] Appl. No.: 497,808

[22] Filed: May 25, 1983

Related U.S. Application Data

[63] Continuation-in-part of Ser. No. 427,859, Sep. 29, 1982, Pat. No. 4,542,473.

[51] Int. Cl.⁴ ............................................... G06F 15/20
[52] U.S. Cl. ..................................... 364/560; 33/504; 33/567; 73/1 J; 364/563
[58] Field of Search ................... 73/1 J; 364/560, 563, 364/571; 33/174 H, 567, 504

[56] References Cited

U.S. PATENT DOCUMENTS

| | | | |
|---|---|---|---|
| 2,134,062 | 10/1938 | Trbojevich | 33/174 H |
| 2,547,087 | 4/1951 | Milligan | 33/174 H |
| 4,043,045 | 8/1977 | Rodriguez | 33/174 H X |
| 4,160,271 | 7/1979 | Grayson et al. | 364/400 |
| 4,180,812 | 12/1979 | Kaltenbach et al. | 340/706 |
| 4,181,958 | 1/1980 | Juengel et al. | 364/560 |
| 4,292,905 | 10/1981 | Widmer | 112/121.11 |
| 4,305,126 | 12/1981 | Beier et al. | 364/413 |
| 4,321,674 | 3/1982 | Krames et al. | 364/413 |

*Primary Examiner*—Parshotam S. Lall
*Assistant Examiner*—Edward R. Cosimano
*Attorney, Agent, or Firm*—Basile Weintraub Hanlon

[57] ABSTRACT

A gage block case includes a plurality of gage blocks mounted within the case, each gage block having opposed gage surfaces with a nominal dimension therebetween and a known deviation from the nominal dimension. Sensors associated with each gage block sense the removal of each gage block from the case. A signal generator provides a distinct signal corresponding to which gage block is removed from the case. A memory stores the known deviation of each gage block within the case. A control unit responsive to the signal generator addresses and retrieves from the memory the known deviation for each gage block which is removed from the case, combines the known deviation with the deviations of previously removed gage blocks and outputs the total deviation to a display device. In a second embodiment, the control unit selects and indicates which gage blocks are to be removed from the case to form a specified stack height input to the control unit.

14 Claims, 12 Drawing Figures

GAGE BLOCK MANAGEMENT SYSTEM

CROSS-REFERENCE TO CO-PENDING APPLICATION

This application is a continuation-in part of application Ser. No. 427,859, filed Sept. 29, 1982, now U.S. Pat. No. 4,542,473 which issued on Sept. 17, 1985 in the name of Donald H. Bailey and entitled "GAGE BLOCK SET".

BACKGROUND OF THE INVENTION

1. Field of the Invention

This invention relates, in general, to gage blocks and, more specifically, to special purpose computing apparatus for use with gage blocks.

2. Description of the Prior Art

Gage blocks are widely used in industry to establish a given dimension for comparative measurement during tool set up or to check a dimension of a finished work piece. The gage blocks are typically packaged in a set which contains a plurality of blocks, each having a different nominal dimension between two parallel gage surfaces. In this manner, selected ones of the gage blocks may be placed in a stack to establish any given dimension.

However, despite the elaborate machining operations which are used in manufacturing gage blocks, it is impossible to perfectly machine each block to the given nominal dimension between the parallel gage surfaces. As any variance or deviation, even if only a few millionths of an inch or millimeter, in the nominal dimension of the gage block could effect its ultimate use, it is essential to know the deviation of each gage block from the nomimal dimension so that the total deviation of the stacked arrangement of gage blocks may be determined and steps taken to compensate for such deviation.

Due to the critical applications with which gage blocks are employed, each gage block is subjected to rigorous testing and certification procedures in order to establish the amount of deviation from the nominal dimension between the gage surfaces. These deviations are set forth on a deviation chart which accompanies each gage block set and which provides the nominal gaging dimension and deviation of each gage block in the set.

Thus, in usage, the machinist must refer to the deviation chart to determine the deviation of the gage block which he has selected and combine that deviation with the deviations of previously selected gage blocks in order to obtain the total deviation of the stacked arrangement of gage blocks. Obviously, this manual operation is subject to numerous errors, such as arithmetic errors in totaling the deviations of the selected gage blocks or choosing the wrong deviation from the deviation chart. Furthermore, this procedure is time-consuming.

In addition, the selection of which gage blocks are to be used to set a pre-determined dimension requires the user to follow a complex procedure in order to use only the optimum number of gage blocks. This procedure, although well known, requires many separate steps and calculations which are subject to numerous errors and takes a considerable amount of time to complete.

Thus, it would be desirable to provide a device which overcomes the problems encounted with previously devised methods for selecting which gage blocks are to be used to form a specified dimension. It would also be desirable to provide a device which automatically calculates and indicates which gage blocks are to be selected without user intervention. Finally, it would be desirable to provide a device which automatically calculates the total deviation of the gage blocks selected for use.

SUMMARY OF THE INVENTION

There is disclosed herein a unique gage block management system which includes means for automatically totaling and displaying the total or the combined deviation of a plurality of gage blocks which have been removed from a gage block case. The gage block case includes a plurality of gage blocks which are removably mounted within receptacles or apertures in the case. As is conventional, each gage block is formed with opposed gage surfaces having a nominal dimension therebetween and a measured deviation from the nominal dimension. Sensor means are mounted in the case and associated with each gage block for sensing the removal of each gage block from the case. Means are provided for generating a signal corresponding to each gage block which has been removed from the case. A control unit, which is responsive to the signal generating means, addresses and retrieves from a memory, the stored deviation of the gage block which has been removed from the case. The control unit combines the deviation of the removed gage block with the total deviation of previously removed gage blocks and outputs the total deviation to a display means which provides a visual display of both the total deviation and total nominal dimension of the selected gage blocks.

In a preferred embodiment, the sensor means comprises a plurality of electrical switches, each being associated with one gage block in the set and which senses the removal of the gage block from the case. The signal generating means comprises an encoder which provides a distinct output signal for each gage block which is removed from the case.

Optionally, a printing means may be connected to the control unit for providing a hard copy of the nominal dimension of each gage block which is removed from the case, the deviation of each removed gage block, as well as the total nominal dimension and total deviation of all of the gage blocks which have been removed from the gage block case.

Reprogramming the memory with new deviations for each gage block is also possible as well as the display of the deviation of each gage block as it is removed from the case.

In another embodiment, a gage block management system includes a central logic unit which executees a control program stored in a memory and automatically selects a series of gage blocks to match a specified stack height or build-up dimension which is input to the central logic unit by means of a keyboard mounted in the case housing the gage blocks. The memory, in addition to storing the control program to be executed by the central logic unit, also stores the nominal dimensions and deviations of each gage block housed within a case.

Upon receiving a pre-determined stack height input via the keyboard, the central logic unit selects those blocks which, when combined, will yield the nominal dimension of the specified stack height. The control means selectively and successively energizes lights located adjacent to each gage block in the case to indicate which gage blocks are to be removed from the case to form the specified stack height.

A display is also mounted in the case and, under the control of the central logic unit, displays the initial input stack height as well as the total actual dimension, including the deviations, of the gage blocks used removed from the case to form the specified stack height.

A printer is optionally mounted within the case for printing the nominal dimension and deviation of each gage block which has been removed from the case as well as the total nominal dimension and the total deviation and/or the combined total of the nominal dimensions and deviations of all the gage blocks which have been removed from the case.

The gage block management system of the present invention overcomes many of the problems encountered with previously devised methods for calculating the total deviation of the gage blocks which have been removed from the case for use at one time. The gage block management system of the present invention automatically totals the deviations of all the gage blocks removed from the case thereby eliminating manual calculation and preventing any user errors during such arithmetic calculations or the possiblity of choosing the wrong deviation from the deviation chart. In addition, the automatic totalization and display of the deviation of the gage blocks removed from the case saves time and increases overall production. A further reduction in set up time is realized when the automatic version of the present gage block management system is utilized since management system devise automatically selects and indicates which gage blocks are to be selected to form a specified stack height.

BRIEF DESCRIPTION OF THE DRAWING

The various features, advantages and other uses of the present invention become more apparent by referring to the following detailed description and drawing in which.

DESCRIPTION OF THE PREFERRED EMBODIMENTS

Throughout the following description and drawing, the same reference number is used to identify the same component illustrated in multiple figures of the drawing.

Figure 1:
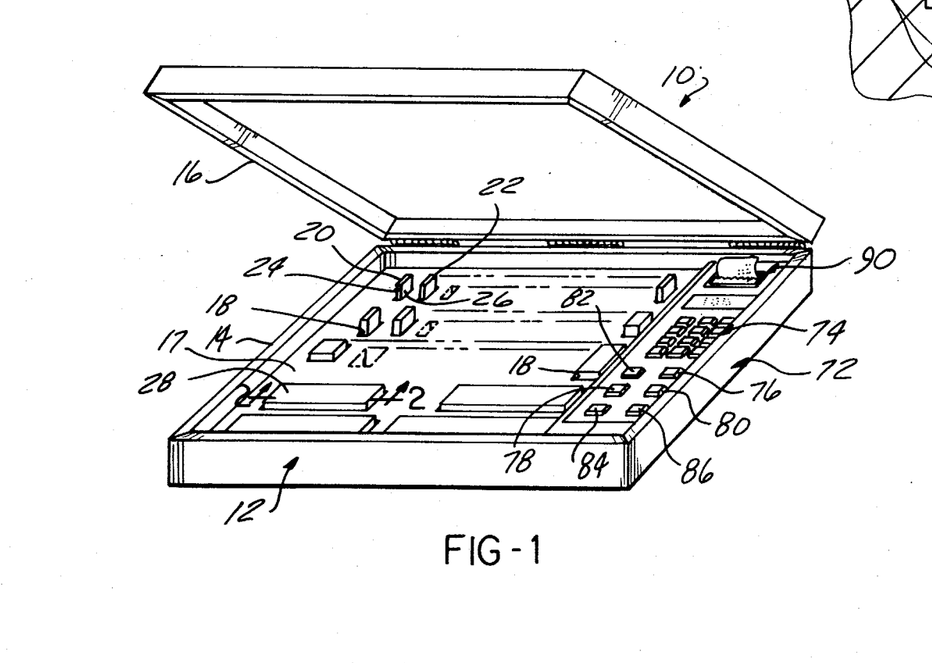
FIG. 1 is a perspective view of a gage block set constructed in accordance with the teachings of one embodiment of the present invention.
Figure 2:
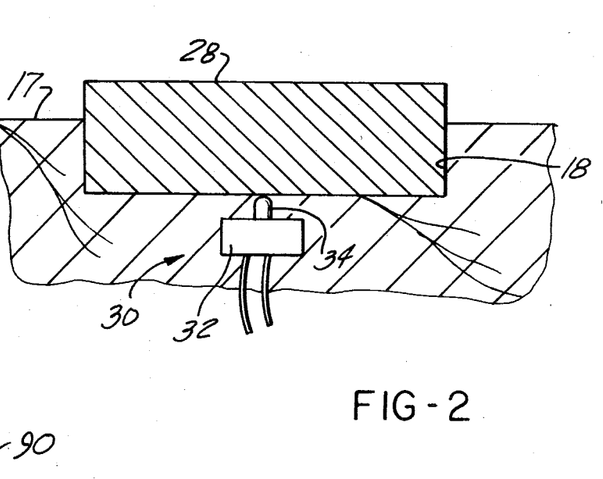
FIG. 2 is a cross sectional view generally taken along line 2—2 in FIG. 1.
Figure 3:
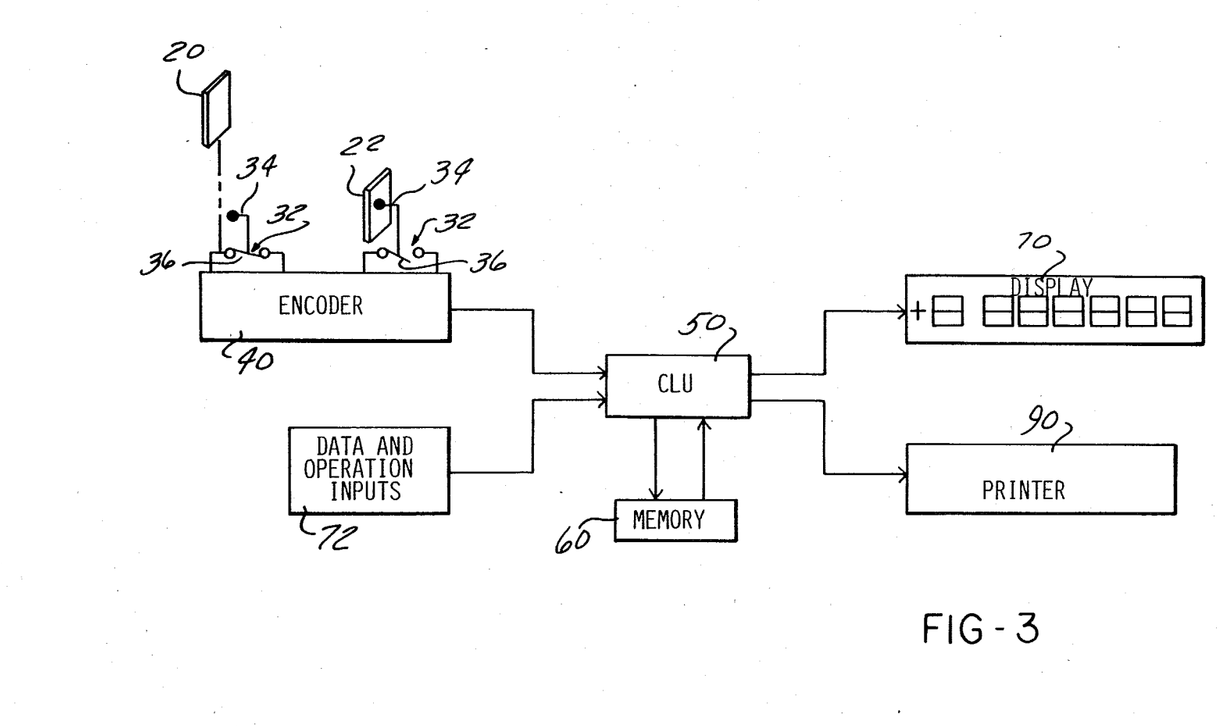
FIG. 3 is a block diagram of the circuitry employed in the gage block set shown in FIG. 1.

Referring now to the drawing, and to FIGS. 1, 2 and 3 in particular, there is illustrated a gage block 10 which is constructed in accordance with the teachings of one embodiment of the present invention. The gage block set 10 provides an automatic totalization of the deviation of all the gage blocks which have been removed from the case for use at one time and displays the total deviation. In addition, an optional hard copy via an integral printer may be obtained.

As shown in FIG. 1, the gage block set 10 includes a case 12 having a bottom portion 14 and a hinged cover 16. The bottom portion 14 is formed with a hollow interior and has a raised base surface 17. A plurality of spaced receptacles or cavities 18 are formed in the base surface 17 to receive individual gage blocks, such as gage blocks 20, 22, etc.

As is conventional, gage blocks are formed in a solid body having a substantially rectangular cross-sectional configuration. Each gage block, such as gage block 20, is formed with opposed, parallel gage surfaces 24 and 26. Gage surfaces 24 and 26 are machined for flatness and parallelism and are spaced apart at a known nominal dimension.

Such receptacles 18 formed in the case 12 have dimensions substantially corresponding to the dimensions of each gage block so as to removably receive each gage block.

In use, selected ones of the gage blocks mounted within the case 12 are removed from the case 12 and arranged in a stack to establish a predetermined dimension for use in tool set up or to check the dimension of a finished work piece.

As is conventional, a plurality of gage blocks are provided in each gage block set and differ from each other in incremental nominal dimensions, either in millimeters or inches. Thus, gage block 20, illustrated in FIG. 1, may have a nominal dimension of 1.0 mm; while the adjacent gage block 22 has a nominal dimension of 1.005 mm.

The remaining gage blocks contained in the gage block set 10 differ from the adjacent gage blocks by 1 or more millimeter or inch increments.

In this manner, selected ones of the gage blocks may be removed from the case 12 and arranged in a stack to establish any dimension.

However, as is well known, the manufacturing of gage blocks is not capable of producing perfect nominal dimensions between the opposed gaging surfaces of each block. Rigorous verification and certification procedures are employed to determine the deviation of dimension between the gaging surfaces of each gage block from the established nominal dimension. These deviations are typically provided for use by the skilled tradesman.

As shown in greater detail in FIG. 2, the gage block set 10 of the present invention includes sensor means denoted in general be reference number 30. Preferably, the sensor means 30 comprises a plurality of electrical switches 32, each having a spring-biased plunger 34 extending outward from a body housing a movable contact. One electrical switch 32 is associated with each gage block in the gage block set 10 and is positioned within the case 12 such that the movable plunger 34 contacts one of the side non-gaging surfaces of each gage block, such as gage block 28 shown in FIG. 2. In this manner, the presence of each gage block, such as gage block 28, within its respective receptacle 18, in the case 12 will depress the plunger of its associated switch 34. Conversely, removal of the gage block 28 from the cavity 18 will enable the plunger 34 to extend outward from the body of the electrical switch 32.

Each switch 32 includes a switchable contact 36, shown in FIG. 3, which moves between closed and open positions in response to movement of the plunger 34. Thus, as shown in FIG. 3, removal of a gage block, such as gage block 20, from the case 12 will cause the plunger 34 to extend outward from the switch 32 associated with the gage block 20 such that the contact 36 moves to the normally closed position. Alternately, the presence of a gage block, such as gage block 22, within its respective receptacle 18 in the case 12 will depress the plunger 34 and cause the contact 36 to move to an open position, as illustrated in FIG. 3. In this manner, the sensor means 30 provides an indication of the removal of each gage block from the case 12.

The gage block set 10 of the present invention further includes means for generating a signal corresponding to which gage block has been removed from the case 12. The signal generating means, which is mounted within the case 12, provides a distinct output signal corresponding to the removal of each gage block from the case 12.

Although each sensor means 30 may be hard wired by suitable conductors to the control unit described hereafter, it is preferred that a digital encoder 40 be employed so as to reduce the number of electrical connections that are required. As shown in FIG. 3, the encoder 40 receives input signals from each electrical switch 32 and provides at its output, a digitally coded signal indicating which gage block has been removed in the case 12.

The gage block set 10 further includes control means 50 in the form of a control or central logic unit which is connected to and responsive to the output from the signal generating means or encoder 40. The control means 50 preferably comprises a computer logic device, such as a micro-processor, which is mounted within the case 12. The control means 50 includes appropriate input and output registers, memory buffers and internal working registers. Alternately, it will be apparent that a discrete logic circuit could be devised to implement the specific functions of the control means 50 which will be described in greater detail hereinafter.

The gage block set 10 of the present invention also includes a memory means 60 which is operative for storing the nominal dimension of each gage block mounted within the case 12 and the known deviation of each gage block. The memory means 60 may be any appropriate type of memory device. However, it is preferred that a ROM or EAROM be utilized for permanently storing the necessary information relating to each gage block mounted within the case 12.

The central logic unit 50 is programmed to generate the necessary memory addresses in response to receiving an output signal from the signal generating means or encoder 40 corresponding to the specific gage block which has been removed from the case 12. The central logic unit 50 retrieves from the memory 60 the deviation of the gage block which has been removed from the case 12.

The central logic unit 50, as will be described in greater detail hereafter, is programmed to total the deviation of each gage block which has been removed from the case 12 with the total deviation of the gage blocks which have been previously removed from the case 12 and to output the new total deviation to a display means 70.

The display means 70 may be any appropriate display device, such as a light emitting diode array (LED) or a liquid crystal display (LCD). The display 70 is provided with an appropriate number of digits as well as plus and minus signs and an appropriately positioned decimal point.

As shown in FIGS. 1 and 3, additional data and operation inputs 72 are provided to the central logic unit 50. These inputs 72 may be provided via manually operated pushbuttons mounted in the case 12. Such inputs include numeric data 74, on/off control 76, + or − deviation information 78 and 80, respectively, automatic or reprogramming mode selection 82, as well as printer control 84 and clear display and total 86.

Optionally, the gage block set 10 of the present invention may be provided with a printer means 90 which provides a hard copy of the nominal dimension of the gage block which has been removed from the case 12, the deviation of the removed gage block, as well as the total deviation of all of the gage blocks which have been removed from the case 12 for a single gaging operation. The printer 90 may be any suitable printer, such as those commonly used in calculators, for printing numeric data.

Figure 4:
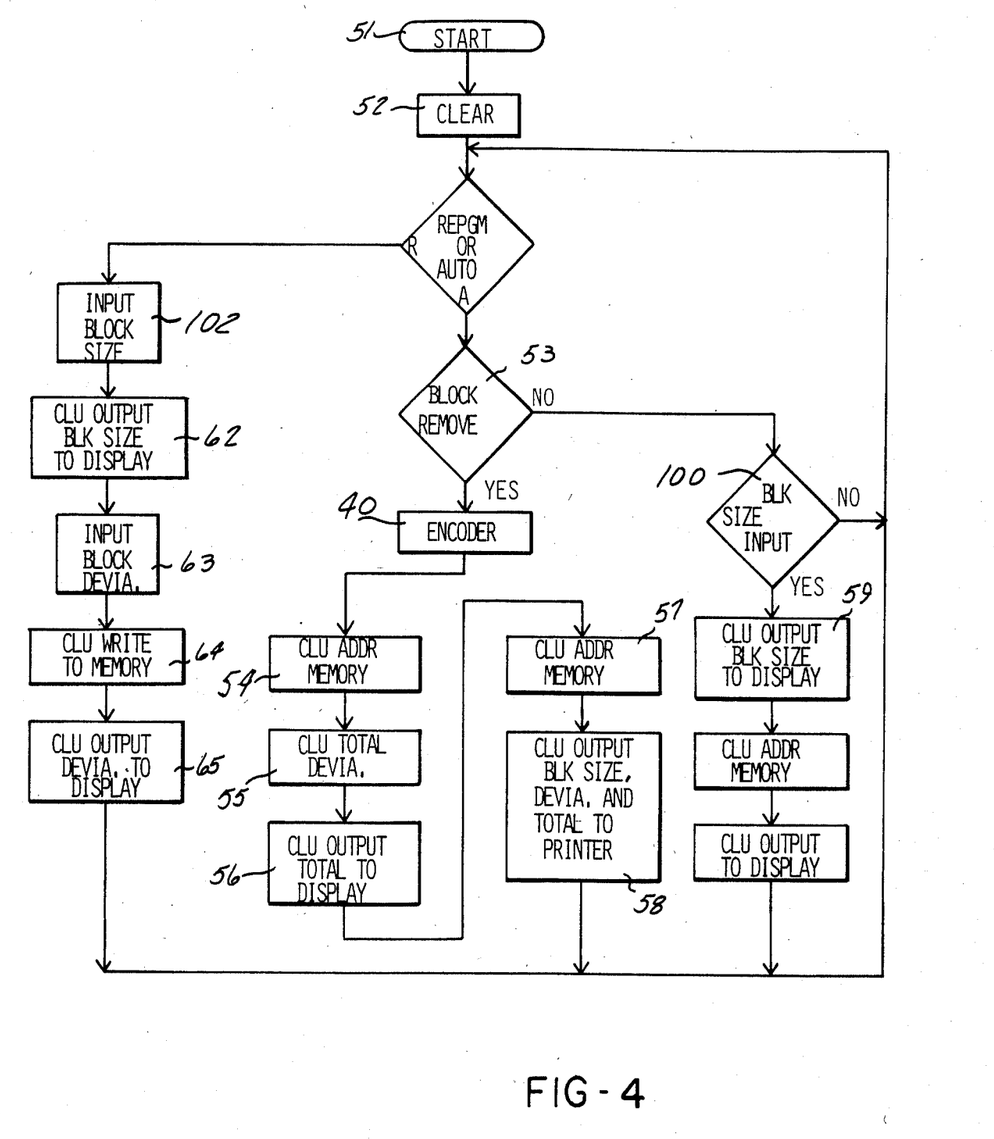
FIG. 4 is a flow diagram illustrating the operational sequence of the control unit employed in the gage block set shown in FIG. 1.

Referring now to FIG. 4, there is illustrated a flow diagram of the various modes of operation of the central logic unit 50. In order to activate the central logic unit 50, the on/off push button 76 is depressed to indicate a start state 51 which activates the central logic unit 50. The clear display and total push button 86 is then pushed to clear the display 70 step 52 as well as the internal working registers of the central logic unit 50. In a normal mode of operation, denoted by "auto", the central logic unit 50 is responsive to the removal of any gage block from the gage block case 12.

When a gage block is removed from the case 12, step 53, the signal generating means or encoder 40 provides at its output a coded signal indicating which gage block has been removed from the case 12. Upon receiving this signal, the central logic unit 50 addresses the memory 60, step 54, and receives therefrom the standard deviation of the gage block which has been removed from the case 12. The central logic unit 50 combines this deviation with the deviations of any previously removed gage blocks for a particular gaging operation 55 and outputs a total to the display means 70, step 56, which provides a visible indication of the total deviation of all of the gage blocks which have been removed from the case 12.

The central logic unit 50 then addresses the memory 60 again and, step 57, receives therefrom the nominal dimension of gage block which has been removed from the gage block case 12, the deviation of the gage block which has been removed and the total deviations of all of the gage blocks which have been removed from the gage block case 12. The central logic unit 50 then outputs this information step 58 to the printer 90 to provide a hard or permanent copy of such information.

As the deviation of each gage block mounted within the case 12 is stored within the memory 60, the deviation of any specific gage block may be displayed by the tradesman manually inputting via the data input keyboard 74, step 100 in FIG. 4, the nominal dimension of the gage block which he wishes to remove from the gage block 12. Upon receiving this information, the central logic unit addresses the memory 60 and outputs to the display 70 the deviation of the gage block which has been entered, step 59. Prior to addressing the memory 60, the central logic unit 50 outputs to the display means 70, for display, the nominal dimension or block size of the gage block selected by the tradesman.

The memory means 60 may be reprogrammed with new deviations for each gage block within the gage block set 10. In selecting this mode of operation, a switch, preferably mounted and protected within the interior of the case 12 is activated to select the reprogramming mode. The tradesman, step 102, then inputs via the data input keyboard 74 the nominal dimension or block size of the gage block which he wishes to reprogram and depresses pushbutton 82 to enter the data into the central logic unit 50. The central logic unit 50 then outputs the input nominal dimension to the display 70 step 62 for verification. The tradesman then inputs 63 via the data input keyboard 74 the new deviation for the specified gage block. The central logic unit 50 inputs and stores this data within the memory 60, step 64. The new deviation is also displayed on the display means 70, step 65. In this manner, the deviation of each gage block within the gage block set 10, upon remachining and reverification, may be stored in the memory 60 for future use.

It should be also be understood that while the numeric keyboard 74 has been depicted as being mounted with the case 12, it is also possible to construct the case 12 without the keyboard 74 and to provide suitable connectors for connecting a separate keyboard unit to the case 12 for reprogramming the memory 60.

Figure 5:
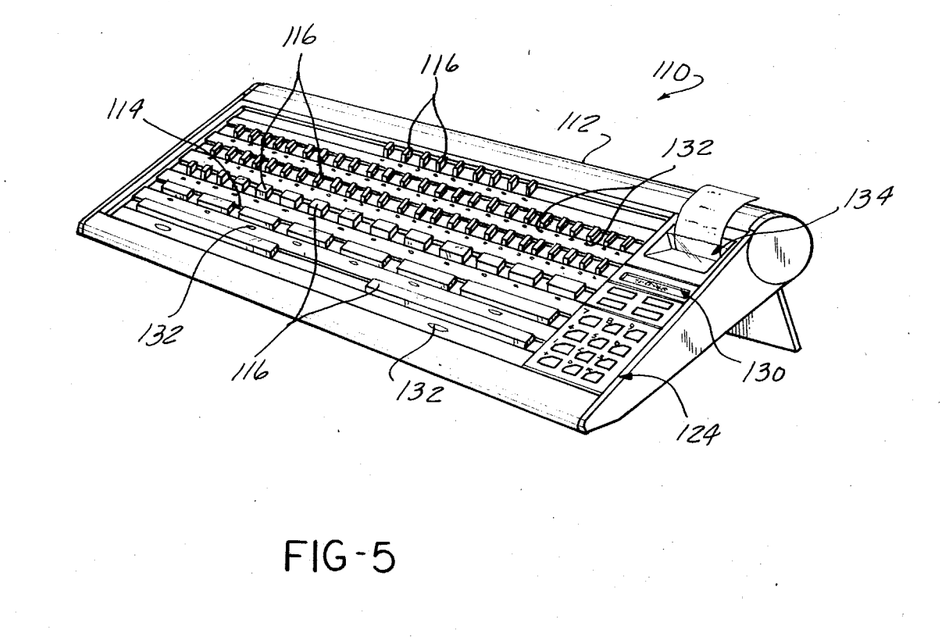
FIG. 5 is a perspective view of a gage block case constructed in accordance with a second embodiment of the present invention.

Referring now to FIG. 5, there is depicted another embodiment of the gage block management system of the present invention. In this embodiment, the gage block management system 110 automatically calculates and selects the required number and size of the gage blocks to meet a specified stack height or build-up dimension which is input to the gage block management system 110. The gage block management system 110 energizes indicators, such as light emitting diodes mounted adjacent to each gage block within the case 112, to specify which gage blocks are to be removed and used to form the specified stack height.

As shown in FIG. 5, the gage block management system 110 includes a case 112 having a plurality of receptacles 114 formed therein. The receptacles 114 receive individual gage blocks 116 having incrementally increasing gage dimensions as described above and depicted in FIG. 1.

Figure 6:
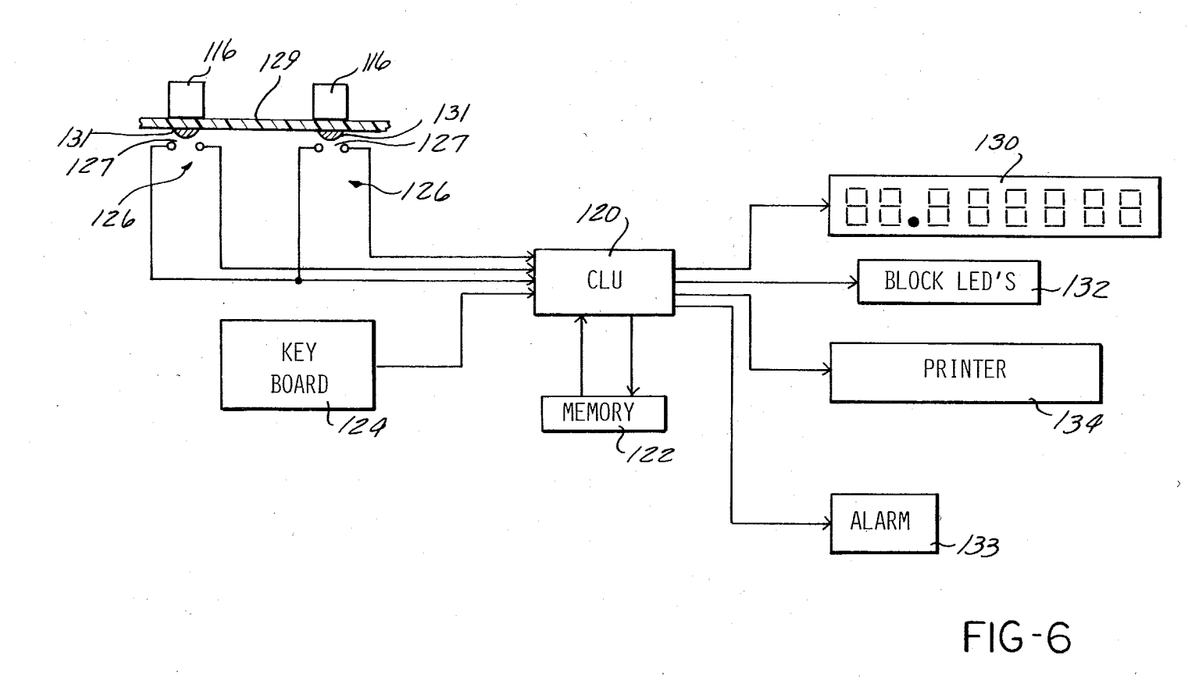
FIG. 6 is a block diagram of the circuitry employed in the gage block case shown in FIG. 5.

As shown in FIG. 6, the gage block management system 110 also includes a control means, such as a central logic unit 120, and a memory means 122 which are housed within the case 112. The memory means 122 can by any suitable type of memory device and is operative for storing the nominal dimensional deviations of each of the gage blocks 116 housed within the case 112 as well as the control program which is to be executed by the central logic unit 120. Preferably, however, the memory means 122 comprises a non-volatile memory, such as a eaprom or eeprom, to permit reprogramming of the deviations of the gage blocks 116 when the gage blocks 116 are recalibrated.

The control means or central logic unit 120 may be any suitable type of computer logic device, such as a microprocessor. The central logic unit 120 executes the control program stored within the memory 122 and selects which gage blocks 116 are to be removed from the case 112 to form a specified stack height or build-up dimension which is input to the central logic unit 120 from a keyboard 124 mounted on the case 112. The central logic unit 120 also receives signals from sensors 126 for indicating when a particular gage block 116 has been removed from the case 112.

The central logic unit 120 also has the capability of calculating the stack height when using a sine device, such as a sine plate or sine bar. The angle and the center distance on the sine device are input via the keyboard 124 to the central logic unit 120 which, in turn, calculates the required stack height. This eliminates the need for a user to refer to a sine table to determine a stack height.

Each sensor 126 is input to the central logic unit 120 to indicate when its associated gage block 116 has been removed from gage block management system 110. By way of example, each sensor 126 comprises a contact 127 mounted in the case 112 at the bottom of each receptacle 114. A thin, flexible, plastic membrane 129 having a plurality of electrically conductive pads 131 mounted thereon is disposed above each contact 127 and supports a gage block 116. In removing a gage block 116 from the case 112, the user initially depresses the gage block 116 within the receptacle 114. This depresses the plastic membrane 129 and causes the pad 131 to engage and complete an electrical circuit through the associated contact 127 to indicate that the particular gage block 116 has been removed from the case 112.

The central logic unit 120 provides an output to a display 130 mounted within the case 112 as well as controlling the operation of a printer 134 also mounted within the case 112.

In addition, the central logic unit 120 selectively energizes illuminating means 132, such as light emitting diodes (LED's) which are mounted adjacent to each gage block 116 in the case 112.

As noted above, the gage block management system 110 includes a keyboard 124 which forms a means for specifying a pre-determined stack height which is to be formed of selected ones of the gage blocks 116 within the case 112. The keyboard 124 includes individual numeric push buttons labeled 0–9. In addition, other functions may also be provided on the keyboard 124 to provide on/off control of the central logic unit 120, printer control, stack height entry, deviation reprogramming, etc.

The gage block management system 110 also includes means for indicating which gage block 116 is to be removed from the case 112. Preferrably, the indicating means 132 comprises an illuminating means, such as a lamp, light emitting diode (LED), etc. A separate light 132 is mounted in the case 112 adjacent to each individual gage block 116. Upon selective energization by the central logic unit 120, a light 132 will flash on and off indicating that the associated gage block 116 is to be removed from the case 112. Upon removal of the gage block 116, the central logic unit 120 will send a continuous signal to the light 132 to maintain the light 132 in a continuously on state until the next stack height dimension is loaded into the central logic unit 120.

The display means 130 may be any appropriate display device, such as a light emitting diode or a liquid crystal array. The display 130 is provided with an appropriate number of digits as well as plus and minus signs and a decimal point. As depicted in FIG. 6, the display 130 is provided with unit and tens digits and six digits to the right of the decimal point.

As a general description of the operation of the gage block management system 110, a specified stack height will be entered by the user into the central logic unit 120 via the keyboard 124. The central logic unit 120 will display the specified stack height on the display 130. The central logic unit 130 will then execute the control program stored within the memory 122 and select the combination of gage blocks 116 whose nominal dimensions will build-up to or total the specified stack height.

The central logic unit 120 will then energize the appropriate lights 132 adjacent to the selected gage blocks 116 to indicate which gage blocks 116 are to be removed from the case 112.

In a preferred embodiment, the central logic unit 120 selects the gage blocks 116 to be removed one at a time. That is, upon entry of a specified stack height, the central logic unit 120 will select the first gage block to be removed from the case 112 and energize the light 132 adjacent to the first selected gage block 116. Upon removal of the first selected gage block 116 from the case 112, the central logic unit 120 will switch the first energized light 132 to a constant on state and select the next gage block to be removed and energize its associated light 132. This process is repeated until the total number of gage blocks 116 required to equal the specified stack height have been removed from the case 112.

Referring now to FIGS. 7A-7F, there is depicted a flow chart which indicates the basic operational steps which the central logic unit 120 follows in executing the control program stored in the memory 122 to select the required number of gage blocks to equal a specified stack height or total. Upon entry of a specified stack height, labeled STK/TOT 140, the central logic unit 120 will initially check to see if the stack height is within the preset range of 0 to 10.9999, blocks 142 and 144. The central logic unit 120 also initializes its various internal registers to set a value labeled REM 146, which indicates the portion of the stack total left after a block has been removed from the case, to the input stack total and a second value labeled TOT/REMV 148, which indicates the number of blocks which have been previously removed from the case 112 in forming the specified stack height, to zero.

Figure 7A:
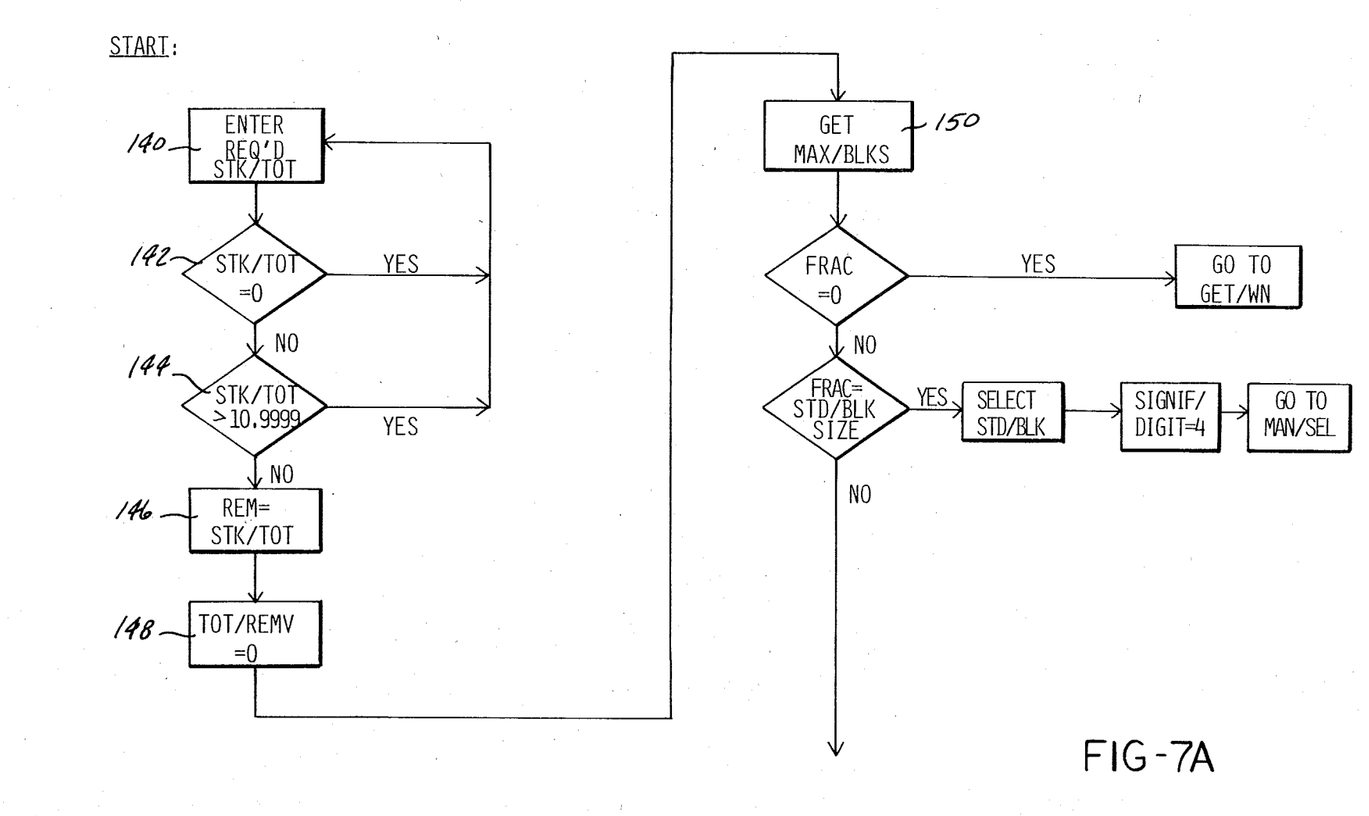
FIGS. 7A through 7F depict a flow diagram illustrating the operational sequence of the control logic unit employed in the gage block case shown in FIG. 5.

The maximum number of blocks which can be used to build up to the specified stack height is also selected from memory and set to equal a value labeled MAX/BLKS 150. In forming a specified stack height, the optimum number of blocks to be utilized is the smallest number of blocks which can be selected from the gage block case 112 to yield the specified stack height.

By way of example, a range of stack heights and optimum number of blocks has been determined and is as follows:

| STK/TOT | MAX/BLKS |
| --- | --- |
| 0.0000-0.9999 | 5 |
| 1.0000-4.9999 | 6 |
| 5.0000-7.9999 | 7 |
| 8.0000-9.9999 | 8 |
| 10.0000-10.9999 | 9 |

The above chart lists the maximum number of gage blocks which may be utilized to form a stack height within the specified ranges. It would be noted that this is the initial number of blocks selected by the central logic unit 120 plus an additional two blocks to allow up to four substitute blocks to be used to replace two originally selected block if the original blocks are not available for use.

Figure 7B:
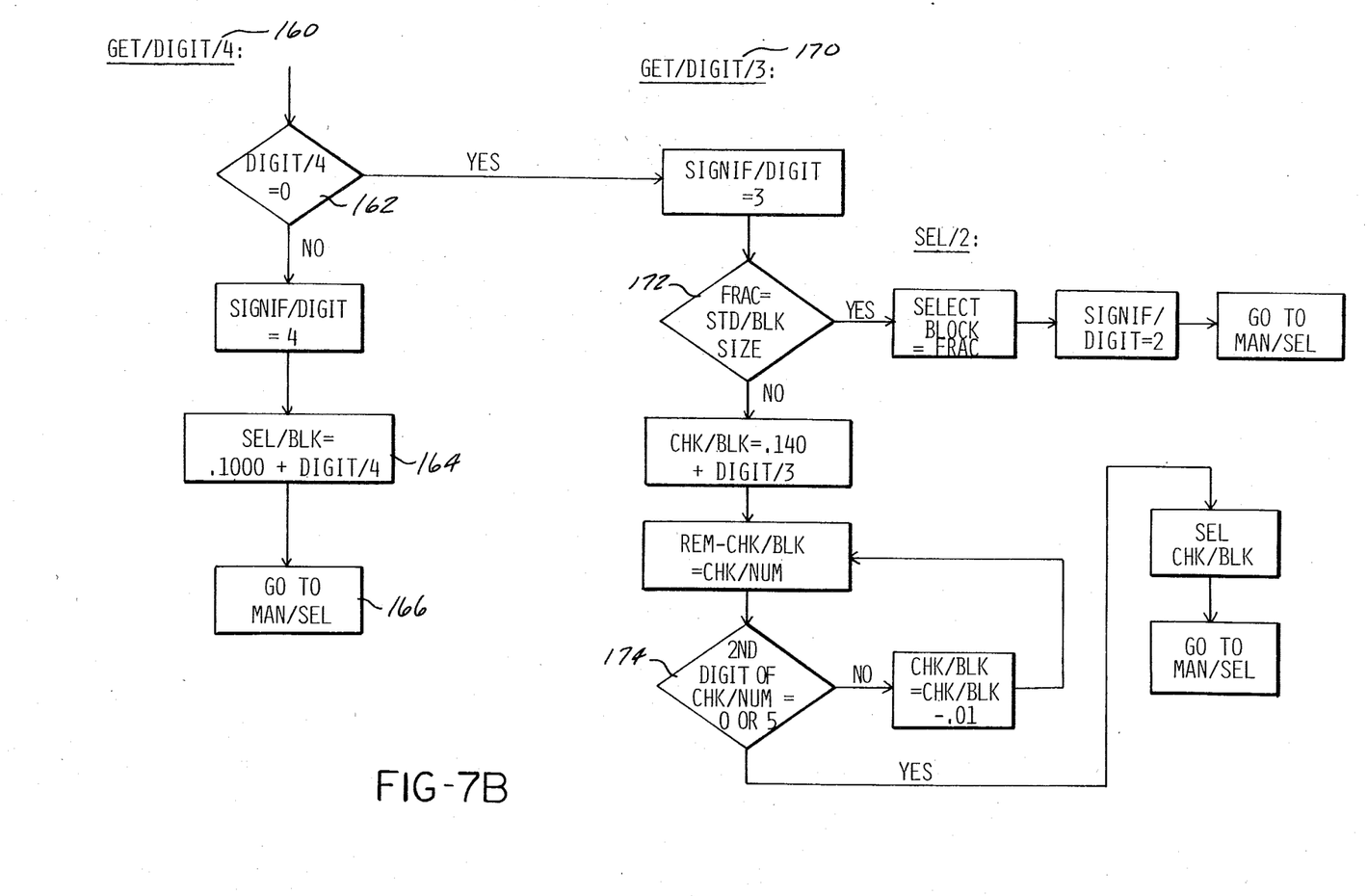

After initializing the various registers, the central logic unit will execute a portion of the control program labeled GET/DIGIT/4 reference number 160, FIG. 7B which selects a gage block eliminating the fourth least significant digit of the stack total. Unless the fourth digit equals 0, step 162, as shown in FIG. 7B, the control program will cause a gage block to be selected which equals 0.1000 plus the value of the fourth least significant digit, as shown in step 164 in FIG. 7B.

Figure 7C:
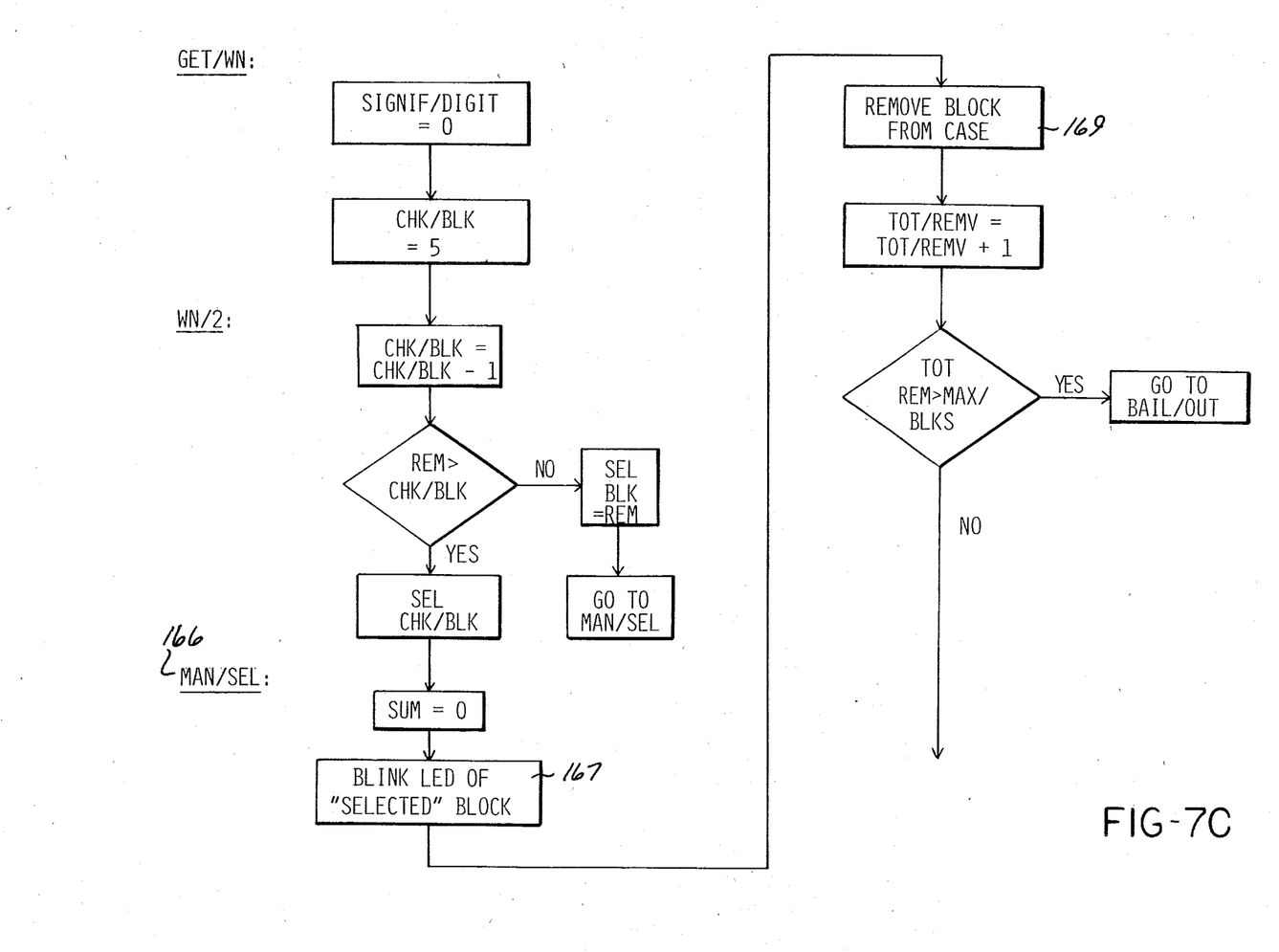
Figure 7D:
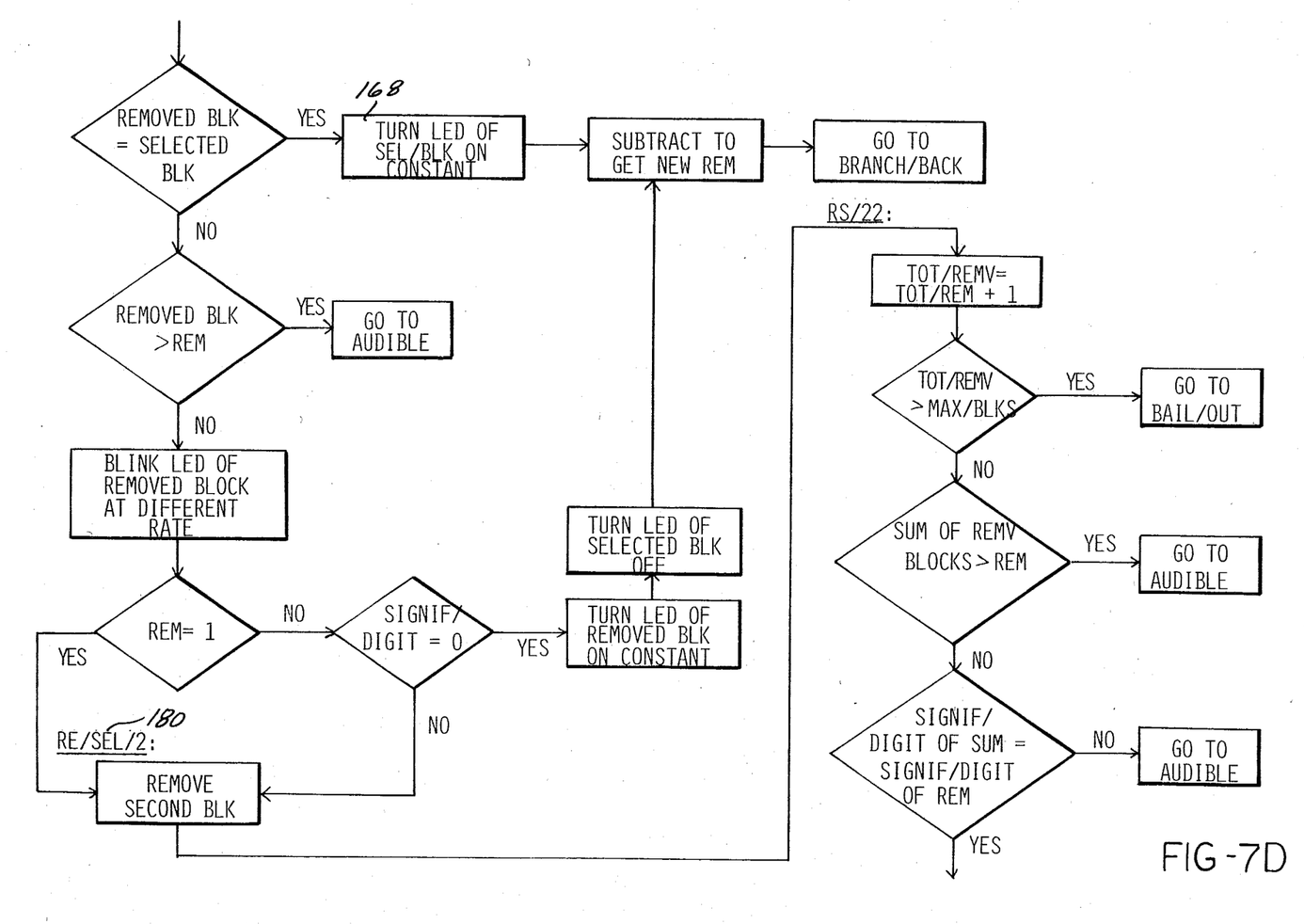

The control program then jumps to a MAN/SEL subroutine 166 for selecting a specified block. As shown in FIG. 7C, the central logic unit 120 in step 167 will cause a light 132 associated with the selected gage block to flash on and off or blink until the block is removed from the case. Upon removal of the correct block, 169 the central logic unit 120 will cause the light 132 to be energized at a constant state, as shown in FIG. 7D by reference number 168.

Various error routines are also included in the control program to check if the total number of blocks removed from the case is more than the maximum number of blocks indicated in the above chart. If such an error is detected, the central logic unit 120 energizes an alarm means 133, FIG. 6, such as an audible or visual alarm mounted within the case 112.

Upon selection of a gage block or blocks which eliminates the fourth least significant digit of the specified stack total, the control program executes a subroutine labeled GET/DIGIT/3 170, FIG. 7B which selects a gage block or blocks to eliminate the third least significant digit of the specified stack total. Unless the TOT/REM value equals a standard block size within the case 112, 172 the control program will select a gage block or blocks for the third least significant digit which will also yield a TOT/REM second digit value of 0 or 5, 174. This will insure that the fractional portion of the TOT/REM value after the third least significant digit is eliminated will equal a standard block size.

After all of the digits to the right of the decimal point of the specified stack total have been eliminated, the control program will then select the whole number to the left of the decimal point and, as with the previously selected whole number gage block. As shown in FIG. 7D, the control program also includes provisions for substituting two gage blocks for and originally selected block if, for some reason, the originally selected gage block is not available for use in forming the specified stack total. The control program will then execute a subroutine labeled RE/SELECT/2, 180, which will enable two gage blocks to be selected in replacement of an orginally selected gage block.

Figure 7E:
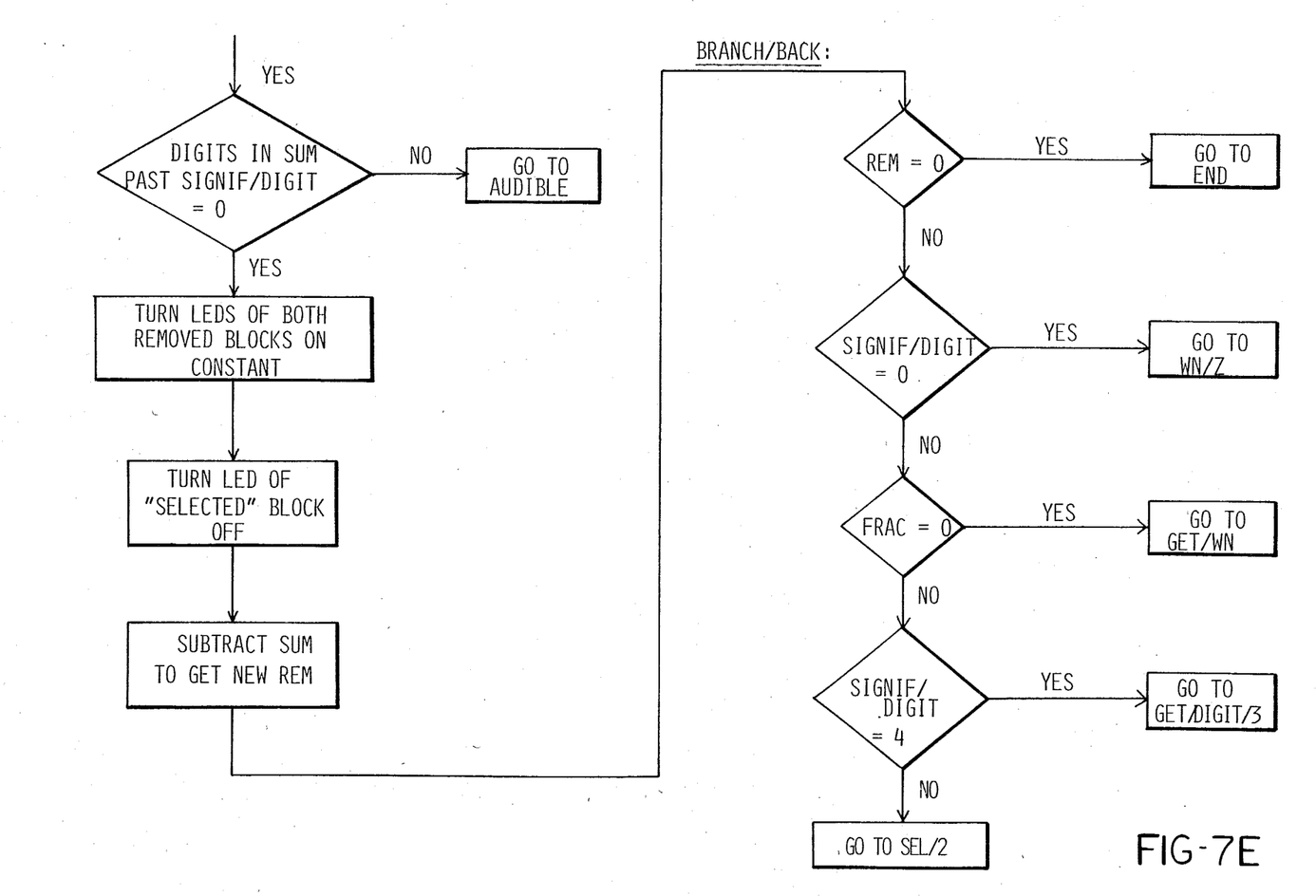
Figure 7F:
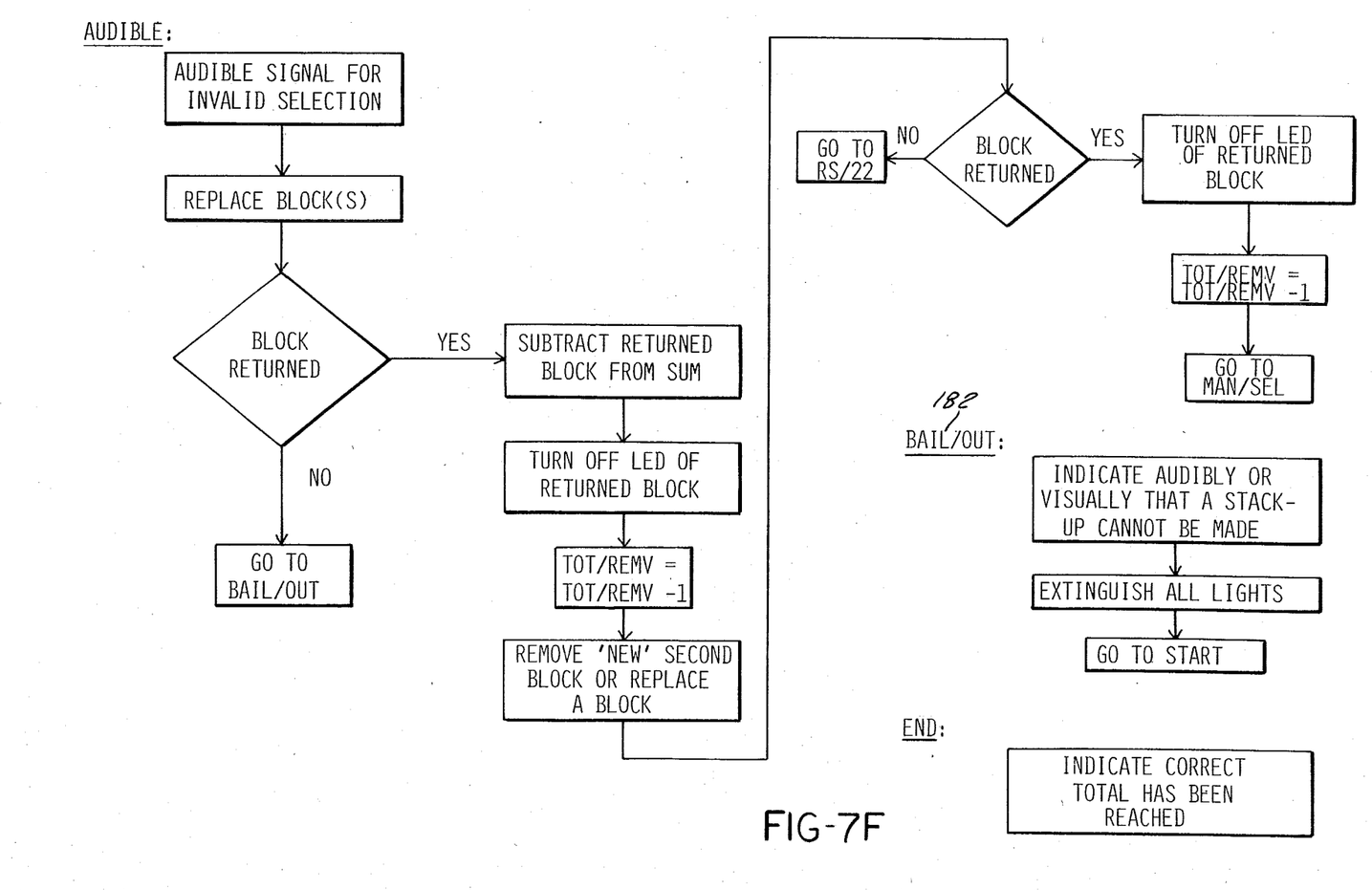

The balance of the flow chart indicated in FIGS. 7E and 7F, which indicates the general operation of the various subroutines utilized to branch the execution of the program back to the other subroutines as well as a subroutine labeled BAIL/OUT 182 which will extinguish all lights and return the control program to the start if a specified stack height cannot be made.

Referring again to FIGS. 5 and 6, there is illustrated the printing means 134 which may be optionally housed within the case 112. The printing means 134 is responsive to the central logic unit 120 for printing various information concerning the gage blocks 116 which have been removed from the case 112. Preferably, the printing means 134 is operative to print at least the nominal dimension and deviation of each gage block which is removed from the case as well as the total nominal dimension and the total deviation of all the gage blocks removed from the case to form a specified stack height.

Various other information, such as time, date, gage block set number and next date of gage block recalibration may also be printed. Although the printer 134 is typically activated after all of the specified gage blocks have been removed from the case 112, subtotals may be printed at any time during the gage block selection process as desired.

Thus, there has been disclosed a gage block set which includes means for automatically totaling and displaying the total deviation and the combined total dimension and deviation of all the gage blocks which have been removed from the gage block case. The gage block case of the present invention eliminates the manual calculations previously needed to calculate the total deviation of the gage blocks selected for use, thereby eleiminating any possibility of arithmetic errors.

In a second version, the gage block management system of the present invention automatically determines which gage blocks are to be used to form a specified stack height or build-up dimension. This eliminates any calculations on the part of the user and significantly decreases the amount of set-up time required to form a specified build-up of gage blocks.

What is claimed is:

1. A gage block management system comprising:
   a case for removably receiving a plurality of gage blocks, each having opposed gage surfaces with a nominal dimension therebetween and a known deviation from the nominal dimension;
   means for specifying a pre-determined stack height formed of selected ones of the gage blocks;
   memory means for storing the nominal dimension and known deviation of each gage block and a control program for selecting which gage blocks are to be selected to form the specified stack height;
   control means for executing the control program in the memory means and selecting which gage blocks are to be selected to form the specified stack height; and
   means, responsive to the control means, for indicating which gage blocks are to be removed from the case to form the specified stack height.

2. The gage block management system of claim 1 wherein:
   the indicating means comprises illuminating means mounted within the case adjacent to each gage block.

3. The gage block management system of claim 2 wherein the illuminating means comprises light emitting diodes.

4. The gage block management system of claim 1 wherein the control means selects the gage blocks to be used to form a specified stack height one at a time, with successive gage blocks being selected after the preceeding selected gage block has been removed from the case.

5. The gage block management system of claim 4 wherein the control means successively selects the gage blocks from the least to the most signficant digit of the specified stack height.

6. The gage block management system of claim 1 further including:
   display means, responsive to the control means, for displaying at least the specified stack height.

7. The gage block management system of claim 1 wherein the means for specifying a pre-determined stack height includes:
   numeric keyboard means mounted within the case for inputting a pre-determined stack height to the control means.

8. The gage block management system of claim 1 further including:
   sensor means, mounted in the case and associated with each gage block, for sensing the removal of each gage block from the case.

9. The gage block management system of claim 8 wherein the control means selects the gage block to be used in forming a specified stack height one at a time and energizes the indicating means associated with each selected gage block means, the control means being responsive to the sensor means for selecting the next gage block when the preceding selected gage block has been removed from the case.

10. The gage block management system of claim 1 further including:
    printer means, mounted within the case and responsive to the control means, for printing certain information about the gage blocks removed from the enclosure.

11. A gage block management system comprising:
    a case;
    a plurality of gage blocks removably disposed within the case, each gage block having opposed gage surfaces with a nominal dimension therebetween and a known deviation from the nominal dimension;
    input means for specifying a pre-determined stack height formed of selected ones of the gage blocks;
    memory means for storing the nominal dimension and known deviation of each gage block within the case and a control program for selecting which gage blocks are to be selected to form a specified stack height;
    control means for executing the control program in the memory means and selecting which gage blocks are to be removed from the case to form a specified stack height;
    display means, mounted within the case and responsive to the control means, for displaying at least the specified stack height; and
    indicating means, mounting within the case in association with each gage block and responsive to the control means, for indicating which gage block is to be removed from the case.

12. The gage block management system of claim 11 wherein the input means comprise a numeric keyboard.

13. The gage block management system of claim 11 wherein the indicating means comprises light means associated with each gage block.

14. The gage block management system of claim 13 further including printer means, mounted within the case and responsive to the control means, for printing certain information about the gage blocks removed from the case.

* * * * *